United States Patent [19]
Wells

[11] 3,783,982
[45] Jan. 8, 1974

[54] TELESCOPING TONGUE AND BRAKE ASSEMBLY FOR TRAILERS

[76] Inventor: Robert F. Wells, 1921 Kentucky, Lawrence, Kans. 66044

[22] Filed: July 13, 1972

[21] Appl. No.: 271,390

[52] U.S. Cl. ............................................ 188/112
[51] Int. Cl. ............................................. B60t 7/20
[58] Field of Search .......................... 188/112, 142; 280/509

[56] References Cited
UNITED STATES PATENTS
2,916,107  12/1959  Huentelman ...................... 188/112
3,285,373  11/1966  Wilson ............................... 188/112

Primary Examiner—Duane A. Reger
Attorney—Schmidt, Johnson, Hovey & Williams

[57] ABSTRACT

A combination telescoping tongue and brake actuator assembly for brake-equipped trailers in which a first section of the tongue is reciprocally received by a second section and is held against extension beyond a predetermined limit by a releasable latch, yet is shiftable in an opposite direction, such shifting or shortening of the tongue causing the brake actuator to apply the trailer brakes. A spring-dampening structure yieldably maintains the two tongue sections biased in opposite directions relative to one another when the latch means is in engagement such that a certain predetermined compressive force must be achieved before the relative movement between the two sections is sufficient for an arm of the brake actuator to cause the latter to actuate the brakes. When released, the latch permits the extension of the tongue beyond the predetermined limit. A chain interconnects the sections at their trailing, rearmost ends and determines the maximum extent to which the tongue may be lengthened.

14 Claims, 5 Drawing Figures

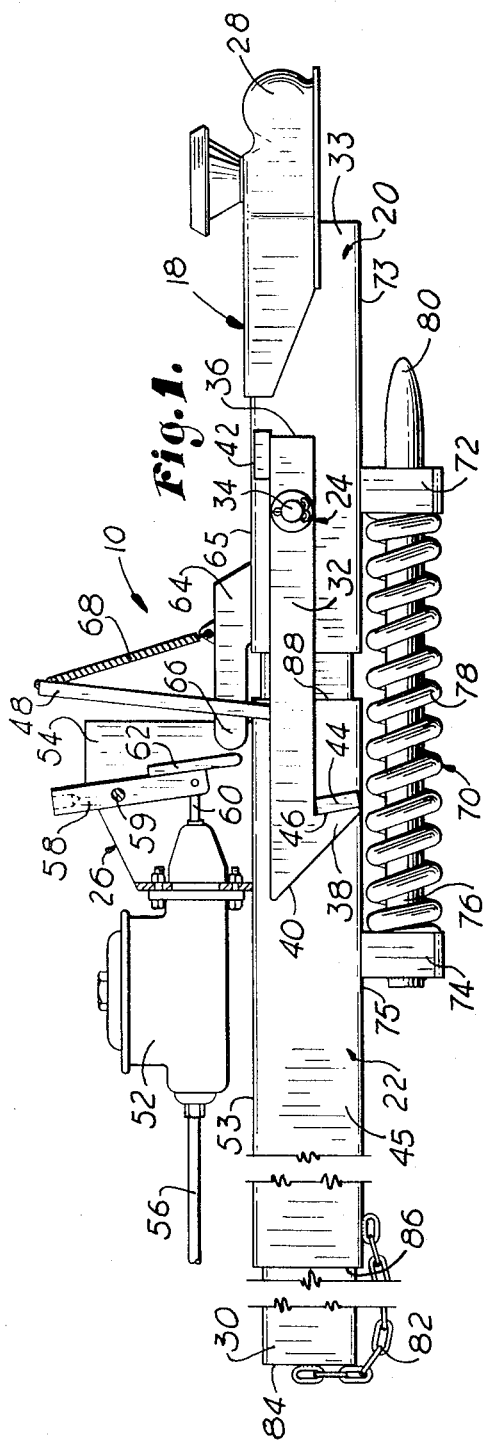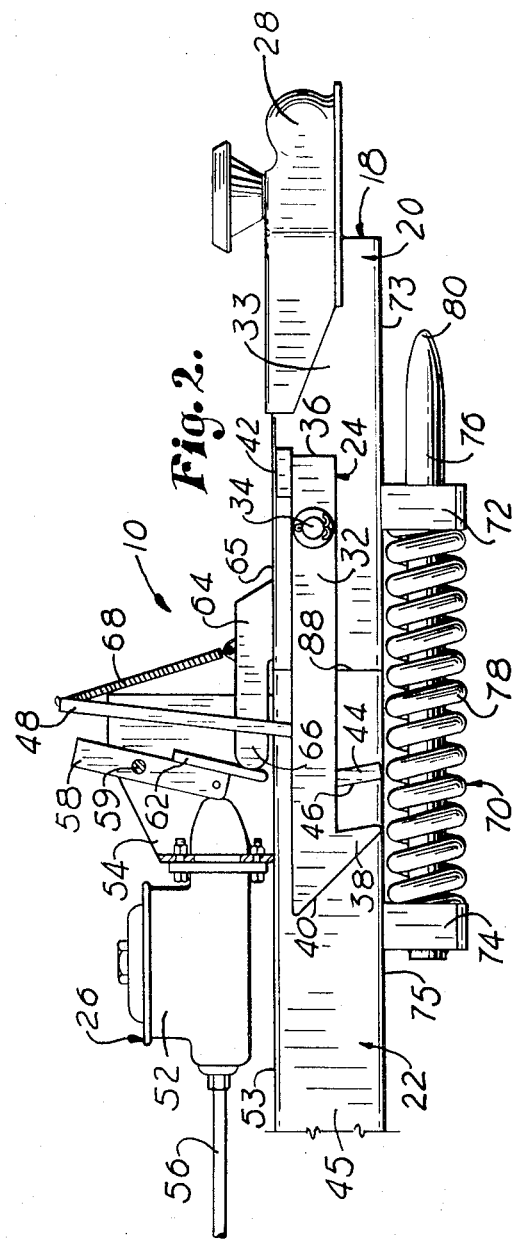

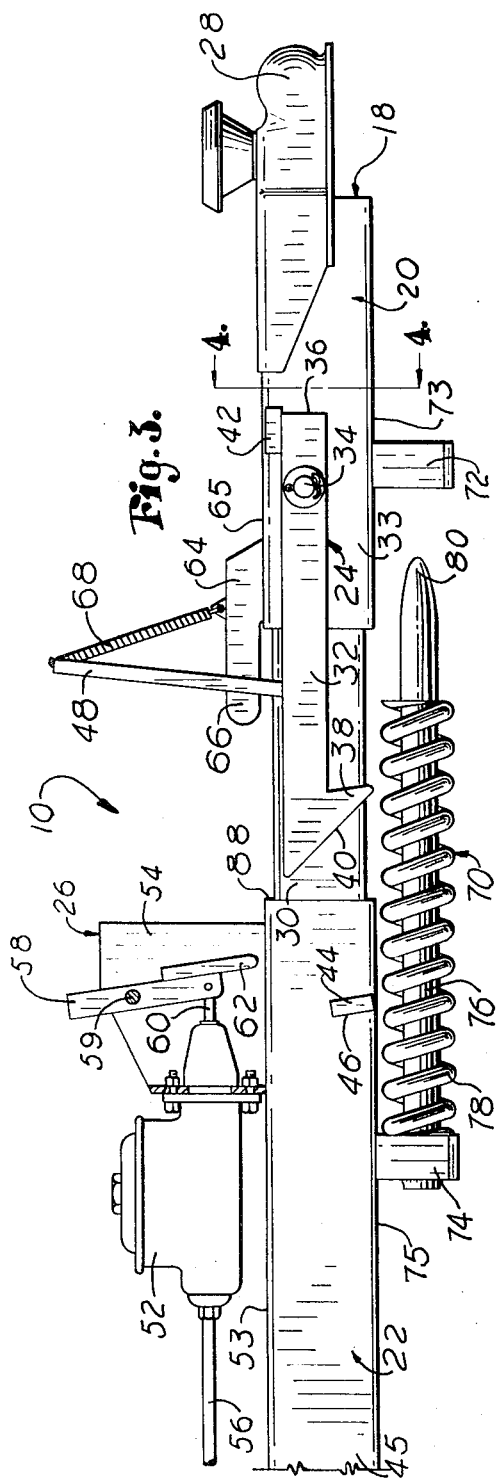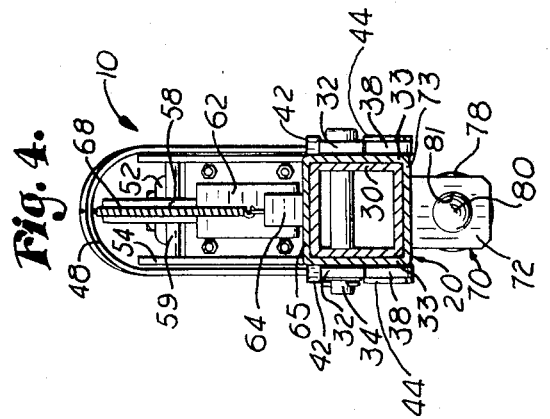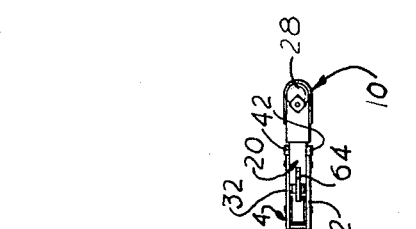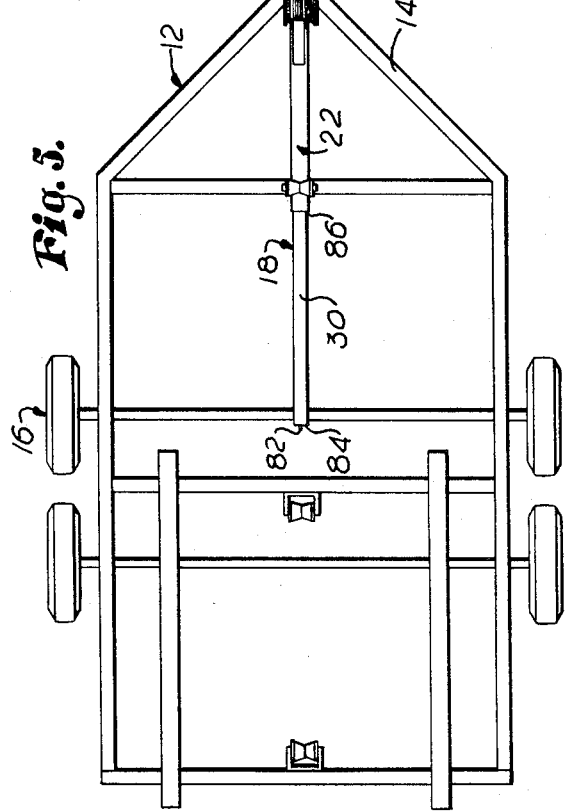

TELESCOPING TONGUE AND BRAKE ASSEMBLY FOR TRAILERS

This invention relates to an extensible tongue for boat trailers or the like which are equipped with conventional wheel brakes and includes a mechanism for activating the brakes of the trailer at such times as the trailer begins to override the towing vehicle, an example of which would be a sudden deceleration of the vehicle. While selectively extensible tongues and surge-type brakes have been individually provided for trailers, the combining of the two features into a single assembly has, up to this time, been unsuccessful.

Extensible tongues in which a releasable holding means rigidly secures the two sections of the tongue to prevent their relative movement in either direction are well-known but such rigid securing is not compatible with the use of surge-type wheel brakes. This results in either sacrificing the extensible feature of the tongue or the need for providing some other type brake that may involve auxiliary connections with the braking system of the towing vehicle or a more expensive, complicated, independent brake control for the trailer.

It is, therefore, a very important object of my invention to provide a combination extensible tongue and brake actuator assembly having a latching means that limits the extent of travel of a first section relative to a second section in one direction while permitting the first section to move relative to the second section in an opposite direction.

It is yet another important object of the present invention to provide an extensible tongue assembly that permits the use of a surge-type brake activator for trailer wheel brakes without the use of separate and auxiliary connections with the towing vehicle.

Another very important object of the invention is to provide latching means interconnecting the respective sections of the telescoping tongue which may be easily and quickly released to permit extension of the tongue, while at the same time precluding the need for any disassembly or disconnection of the braking system.

A still further important object of the invention is to provide latching means which will automatically interconnect the two sections of the tongue and therefore limit the extent of subsequent extension thereof until the latch means has been manually released and which will also automatically place the brake actuating mechanism in a position to activate the brakes upon further telescoping of the respective sections.

Yet another object of the invention is to provide a motion-dampening structure in conjunction with the latching means that will preclude further telescoping of the tongue and subsequent activation of the braking system when such means are interconnecting the two sections until a certain predetermined pressure has been generated between the two respective tongue sections.

Another object of the invention is to provide a trailer surge-type brake actuating mechanism that may be easily and quickly placed in an inoperative condition when the trailer is to be backed, thus preventing unwanted activation of the brakes in case an obstruction is encountered that would cause the normal dampening structure to be overridden.

In the drawings:

FIG. 1 is a fragmentary, side elevational view of a combination telescoping tongue and brake assembly for trailers made according to the present invention and showing the assembly in its normally latched position for towing purposes;

FIG. 2 is a fragmentary, side elevational view of the tongue assembly similar to FIG. 1, but showing the tongue in its extreme telescoped position, causing the brake actuating mechanism to be activated;

FIG. 3 is another fragmentary, side elevational view similar to FIGS. 1 and 2 except that in this instance, the latch means interconnecting the two sections of the tongue has been released to permit extension of the tongue;

FIG. 4 is a transverse, cross-sectional view of the tongue taken along line 4—4 of FIG. 3; and FIG. 5 is a plan view, on a reduced scale, of a trailer having a telescoping tongue and brake actuating assembly.

A combination telescoping tongue and brake actuator assembly, broadly designated by the numeral 10, is provided for use with a non-powered vehicle 12, such as a trailer for boats or the like and adapted to be towed by a powered second vehicle (not shown). The trailer 12 has an elongated undercarriage or frame 14 which is provided with a wheel and axle running gear 16 that is equipped with conventional wheel brakes (not shown). The assembly 10 comprises an extensible tongue 18 having an elongated, first section 20 and a second, elongated, tubular section 22 which telescopically receives the first section 20. The assembly 10 further includes a latching means 24 releasably interconnecting sections 20 and 22 and a mechanism 26 which is actuatable in response to movement of one of the tongue sections 20 or 22 relative to the other to energize the trailer brakes.

The section 20 includes a conventional ball-type hitch socket 28 at a normally forward leading end thereof and includes a slightly reduced, rearwardly extending portion 30 which is of a size and configuration to be complementally received by the second section 22. It is to be further noted that the section 22 forms a part of the trailer undercarriage 14 and is disposed along the longitudinal axis thereof.

The releasable means 24 include a pair of elongated latches 32, one latch 32 being pivotally attached along each longitudinal sidewall 33 of the section 20 and having its longitudinal axis parallel with the longitudinal axis of the tongue 18. The latches 32 are swingable about a common transverse axis 34 which is proximal their forwardmost ends 36 and are each provided with a hook 38 at their respectively rearwardly inclined trailing ends 40. A stop 42 projects laterally from each sidewall 33 of the section 20 to limit the rotational movement of a respective latch 32, the stops 42 being in overlying relationship to their respective latches 32 near the ends 36. The means 24 further includes a catch 44 complementally mounted on each opposing, longitudinal sidewall 45 of the section 22 to present a rearwardly inclined surface 46 for complementally engaging a corresponding hook 38. Also, a generally upright, U-shaped handle 48 interconnects the latches 32.

The mechanism 26 includes a brake energizer in the form of a hydraulic brake master cylinder 52 mounted on the top wall 53 of the section 22 through the use of a bracket 54 and coupled to the wheel brakes by a line 56. The cylinder 52 may be one of any number of the kind commonly available for usage in conjunction with a surge-type braking system. The bracket 54 also supports a lever 58 swingable about a transverse axis 59, having one end that is pivotally attached to a plunger rod 60 of the cylinder 52 and is provided with a forwardly facing contact plate 62. An actuating arm 64 is mounted on the top wall 65 of the section 20 and is provided with a rearwardly projecting extension 66 in longitudinal alignment with the plate 62. A tension spring 68 interconnects the arm 64 and the handle 48, the purpose of which will be made evident elsewhere in the specification.

A dampening structure 70 is provided between the first and second sections 20 and 22 respectively, and includes a pair of tabs 72 and 74 permanently attached to the lower walls 73 and 75 of respective sections 20 and 22, the tab 74 carrying a forwardly projecting, elongated guide pin 76 which supports a compression spring 78. The tabs 72 and 74 are in axial alignment such that a forwardly exposed point 80 of the pin 76 passes through an opening 81 in the tab 72 when the latches 32 are in engagement with their respective catches, as best seen in FIGS. 1 and 2.

An elongated, multiple link chain 82 joins the two sections 20 and 22 to determine the maximum length to which the tongue 18 may be extended. As seen in FIG. 1, one end of the chain 82 is attached to a rearwardly facing wall 84 of the portion 30 while the opposite end of the chain 82 is affixed to the downwardly facing wall 75 of the section 22 proximal a rearmost end 86 thereof.

In operation, the telescoping tongue and brake actuator assembly with its two sections 20 and 22 in a nested relationship, is disposed in the configuration best shown in FIGS. 1 and 5 to define a normal transport position when the trailer 12 is attached to a towing vehicle for travel therebehind. The forward pull of the towing vehicle causes the hooks 38 of the latches 32 to bear against the surfaces 46 of their catches 44 and thus impart a pulling action to the undercarriage 14 and running gear 16. Upon deceleration of the towing vehicle, such as is caused by the applying of brakes or letting up on the accelerator, the initial tendency for the trailer 12 to overrun the towing vehicle and the resultant movement forward of the section 22 with respect to the section 20 is resisted by the compression spring 78 of the dampening structure 70. This allows for minor variations in relative speed of the trailer 12 and the towing vehicle without immediately and unnecessarily actuating the trailer brakes.

If, during deceleration, the force generated by the momentum of the trailer 12 in its tendency to overrun the towing vehicle is sufficiently great to compress the spring 78, the second section 22 moves forwardly with respect to the first section 20 as seen in FIG. 2, the extension 66 of the arm 64 coming into contact with the plate 62, causing the lever 58 to pivot such that the plate 62 moves rearwardly, thus depressing the plunger 60 of the cylinder 52 to energize the brakes of the running gear 16. Conversely, upon resumption of normal speed, the first section 20 will move forwardly with respect to the second section until such time as the travel is limited by the engagement of the hooks 38 with the surfaces 46 of the catches 44. From the foregoing description and reference to FIGS. 1 and 2, it becomes readily apparent that there is presented a latching means for a telescoping or extensible tongue that normally limits the extent of relative travel in one direction of the two sections with respect to one another while at the same time allowing movement of the two sections relative to one another in an opposite direction and in so doing, causing the energizer for the running gear braking system to be actuated.

The versatility and uniqueness of the assembly 10 is further exemplified by the fact that upon release of the interlocking latching means 24, the tongue 18 may be extended a considerable distance beyond the normally limited direction without the need for disconnecting or in any way disassembling the brake actuating mechanism. This arrangement is particularly useful for boat trailers at the time a boat is to be launched therefrom. Just prior to backing the trailer into the water, the latches 32 may be manually swung upwardly by grasping the handle 48 to raise the same against the action of spring 68 to thus swing the latches about the axis 34 and cause the hooks 38 to clear their respective catches 44. It is to be understood that because of the upwardly and rearwardly inclined surface, the first section 20 must be shifted rearwardly with respect to the section 22 of a slight distance in order to provide clearance for the hook 38. Once the latches 32 have been raised it is then but a simple matter for the trailer to be manually pushed rearwardly such that the undercarriage 14, along with its second section 22 of the tongue, moves rearwardly with respect to the first section 20, thus extending the tongue 18 as best seen in FIG. 3.

The length of the chain 82 determines to what extent the tongue assembly 18 may be lengthened. As the trailer 14, with its section 22, is caused to move rearwardly with respect to the first section 20, the end 84 enters the interior of the tubular second section 22 and takes with it the chain 82. It is to be pointed out that the chain 82 becomes taut, thus precluding further movement of the section 22 relative to section 21, before the end 84 reaches the forward end 88 of the second section 22 and as such permits towing of the trailer 12 out of the water while the tongue 18 is in this extended condition.

Upon release of the handle 48 the spring 68 pulls the handle 48 and, therefore, the latches 32, back to their normally horizontal positions, the stops 42 limiting their downward swinging movement when the tongue 18 is in its extended position. The latches 32 are now in a position to automatically reinterconnect the sections 20 and 22 when the latter are caused to shift relative to one another in a direction to bring the hooks 38 back into engagement with the catches 44 for normal towing purposes. This may be done either by placing a block in back of the wheels of the trailer 12 and moving the section 20 rearwardly, or manually pushing the trailer forwardly against the holding action of the towing vehicle until the catches 44 engage their respective hooks 38. It is to be noted that the upwardly and rearwardly sloping ends 40 are so disposed to cause the hooks 38 to automatically slide over and engage their respective catches 44 upon such relative shifting.

In order to preclude the unwanted setting of the trailer brakes during the backing of the trailer, as might be the case if rocks, ruts, or other obstructions might be encountered, the lever 58 may be easily disconnected from the plunger 60 and swung about the axis 59 so that the plate 62 is disposed above the extension 66 so as not to be contacted by the latter in the event the compression spring 78 is overridden.

The telescoping tongue and brake actuator assembly 10 is particularly advantageous for boat trailers, although not limited to such, in that this provision for extending the tongue 18 makes it unnecessary to back the towing vehicle into the water in order to place the trailer, with its boat, in water of sufficient depth to effect the launching of the boat. Furthermore, the latching means 24 limits the relative movement of the two sections of the tongue in one direction for normal towing purposes, while at the same time permitting the relative movement of the two sections in an opposite direction to activate the surge-type brake as required.

The dampening spring arrangement effectively restricts the relative movement of the two sections of the tongue to preclude the unnecessary activation of the brake energizing mechanism each time there is a slight variation in the pulling tension exerted on the tongue, yet can be easily overridden once sufficient pressure is generated by the trailer 12 in attempting to overrun the towing vehicle to cause the safe actuation of the trailer brakes. The dampening structure 70 further serves to maintain a constant opposing pressure on the two sections 20 and 22 such that the latches 32 remain in engagement with their respective catches 44 and do not tend to jiggle or bounce sufficiently to cause their disengagement during normal road travel. The tension spring 68 also assists in maintaining the latches in their proper positions.

Having thus described the invention, what is claimed as new and desired to be secured by Letters Patent is:

1. a combination telescoping tongue and brake actuator assembly for a brake-equipped, towed vehicle, said assembly comprising:

an extensible tongue having a first, elongated section and a corresponding second, elongated, tubular section which slidably and telescopically receives said first section for reciprocation relative thereto;

holding means releasably interconnecting said first and second sections in a manner to retain the same in a nested relationship defining a normal transport position and limiting the extent of travel of said first section relative to said second section in one direction yet permitting slight movement of said first section relative to said second section in an opposite direction; and mechanism carried by said tongue and coupled to said brake for actuating the latter when said first and second sections are interconnected by said holding means, said mechanism being actuatable in response to the movement of said first section in said opposite direction, said first section also being selectively shiftable in said one direction to extend forwardly of said second section beyond the limit of said holding means and in an essentially non-nested relationship when the latter is released for presenting said tongue in a substantially elongated, operably extended position.

2. An assembly as claimed in claim 1, wherein said one direction is normally forward with respect to the direction of travel of said vehicle.

3. An assembly as claimed in claim 1, wherein said vehicle includes an undercarriage, said second section forming a part of said undercarriage.

4. An assembly as claimed in claim 1, wherein said mechanism includes a brake energizer and an actuating arm, said energizer being mounted on one of said sections and said arm being mounted on the other of said sections, said arm being engageable with said energizer to activate the latter upon the movement of said first section in said opposite direction.

5. An assembly as claimed in claim 4, wherein said energizer includes a hydraulic master cylinder.

6. An assembly as claimed in claim 4; and dampening structure between said first and second sections for yieldably restricting said movement of said first section in said opposite direction until a predetermined force has been generated.

7. An assembly as claimed in claim 6, wherein said structure includes a compression spring.

8. A combination telescoping tongue and brake actuator assembly for a brake-equipped, towed vehicle, said assembly comprising:

an extensible tongue having a first, elongated section and a second, elongated, tubular section which slidably receives said first section for reciprocation relative thereto;

means releasably interconnecting said first and second sections to limit the extent of travel of said first section relative to said second section in one direction yet permitting movement of said first section relative to said second section in an opposite direction when said first and second sections are interconnected by said means; and mechanism carried by said tongue and coupled to said brake for actuating the latter, said mechanism being actuatable in response to the movement of said first section in said opposite direction, said first section also being shiftable in said one direction beyond said limit when said means is released, thereby permitting said tongue to be extended, said releasable means including an elongated latch having a hook at one end thereof, said means further including a complementary catch, said latch being mounted on one of said sections and said catch being mounted on the other of said sections.

9. An assembly as claimed in claim 8, wherein said catch is intermediate the ends of said latch in underlying en-gagement therewith when said sections are interconnected by said means.

10. An assembly as claimed in claim 9, wherein said latch is swingable from a catch engageable position to a raised position out of engagement with said catch whereby said hook clears said catch thereby permitting extension of said tongue.

11. An assembly as claimed in claim 10, wherein said latch is spring-loaded for normally retaining said latch in said first position whereby said hook end automatically engages said catch upon movement of said first section in said opposite direction a sufficient distance to cause said catch to be disposed intermediate the ends of said latch.

12. An assembly as claimed in claim 8, wherein said catch presents a rearwardly inclined hook-engaging surface, said hook having a complementally inclined catch-engaging stretch whereby said first section must move in said opposite direction prior to the releasing of said interconnecting means.

13. An assembly as claimed in claim 1; and a flexible limiter joining said two sections at their respective normally rearmost ends for restricting the travel of said first section relative to said second section when said sections are not interconnected by said means thereby limiting the extension of said tongue.

14. A combination telescoping tongue and brake actuator assembly for a brake-equipped, towed vehicle, said assembly comprising;

an extensible tongue having a first, elongated section and a second, elongated, tubular section which slidably receives said first section for reciprocation relative thereto;

means releasably interconnecting said first and second sections to limit the extent of travel of said first section relative to said second section in one direction yet permitting movement of said first section relative to said second section in an opposite direction when said first and second sections are interconnected by said means;

mechanism carried by said tongue and coupled to said brake for actuating the latter, said mechanism being actuatable in response to the movement of said first section in said opposite direction, said first section also being shiftable in said one direction beyond said limit when said means is released, thereby permitting said tongue to be extended; and a limiter joining said two sections for restricting the travel of said first section relative to said second section when said sections are not interconnected by said means thereby limiting the extension of said tongue, said first section extending rearwardly beyond said second section when said sections are interconnected by said means and each of the sections having normally rearwardmost trailing ends, said limiter being attached to the end of said first section and adjacent the end of said second section, the end of said first section being disposed interiorly of said second section when the tongue is extended, said limiter trailing the end of said first section into said second section.

* * * * *